United States Patent
Muscat et al.

(10) Patent No.: US 12,040,603 B2
(45) Date of Patent: Jul. 16, 2024

(54) DEVICE FOR CABLE MANAGEMENT

(71) Applicants: Joshua John Muscat, Placerville, CA (US); Narendhar Mohanasundram, Singapore (SG)

(72) Inventors: Joshua John Muscat, Placerville, CA (US); Narendhar Mohanasundram, Singapore (SG)

( * ) Notice: Subject to any disclaimer, the term of this patent is extended or adjusted under 35 U.S.C. 154(b) by 0 days.

(21) Appl. No.: 18/099,946

(22) Filed: Jan. 22, 2023

(65) Prior Publication Data

US 2023/0261457 A1 Aug. 17, 2023

Related U.S. Application Data

(60) Provisional application No. 63/311,091, filed on Feb. 17, 2022.

(51) Int. Cl.
*H02G 3/32* (2006.01)
*F16L 3/233* (2006.01)
*B65D 63/10* (2006.01)

(52) U.S. Cl.
CPC .............. *H02G 3/32* (2013.01); *B65D 63/10* (2013.01); *F16L 3/233* (2013.01); *F16L 3/2332* (2013.01); *F16L 3/2334* (2013.01); *F16L 3/2336* (2013.01)

(58) Field of Classification Search
CPC .......... H02G 3/32; F16L 3/233; F16L 3/2336; F16L 3/2332; Y10T 24/1498
See application file for complete search history.

(56) References Cited

U.S. PATENT DOCUMENTS

| | | | | |
|---|---|---|---|---|
| 5,267,373 | A | * | 12/1993 | Chisek ............... B65D 63/1072 24/30.5 P |
| 6,126,122 | A | * | 10/2000 | Ismert ..................... F16L 3/243 24/271 |
| 6,151,761 | A | * | 11/2000 | Thompson .............. E05B 75/00 24/16 PB |
| 8,290,330 | B2 | * | 10/2012 | Taylor ..................... H04Q 1/06 385/134 |
| 9,310,013 | B2 | * | 4/2016 | Komaro ................. H02G 3/266 |
| 10,439,381 | B1 | * | 10/2019 | Mohlman ................ H02G 3/32 |
| 2002/0084388 | A1 | * | 7/2002 | Geiger .................... F16L 3/233 248/69 |

(Continued)

FOREIGN PATENT DOCUMENTS

EP 1369630 A1 * 12/2003 ......... B65D 63/1063

*Primary Examiner* — Tan Le

(57) ABSTRACT

An apparatus for cable management comprising fastening heads each of which has a head body having an outer surface and one or more inner surfaces. Each inner surface defines a plurality of walls which cooperatively form an aperture thereamong. A pawl extends from a first wall of the aperture toward a second wall of the aperture. The pawl comprises a face having pawl teeth. A flexible alignment guide is disposed on the head body which is configured to apply a biasing force to urge a strap into an alignment with the face of the pawl for an engagement between the pawl teeth and the strap teeth. The pawl teeth comprise an engagement region having a leading edge oriented inwardly toward the second wall and a flank region extending downwardly from the leading edge. The engagement region being configured for the engagement between the pawl teeth and the strap teeth.

20 Claims, 14 Drawing Sheets

(56) References Cited

U.S. PATENT DOCUMENTS

2005/0155338 A1* 7/2005 Wehler ................ H02G 11/006
                                                                                59/78.1
2006/0162130 A1* 7/2006 Cook ................ B65D 63/1072
                                                                               24/16 PB

* cited by examiner

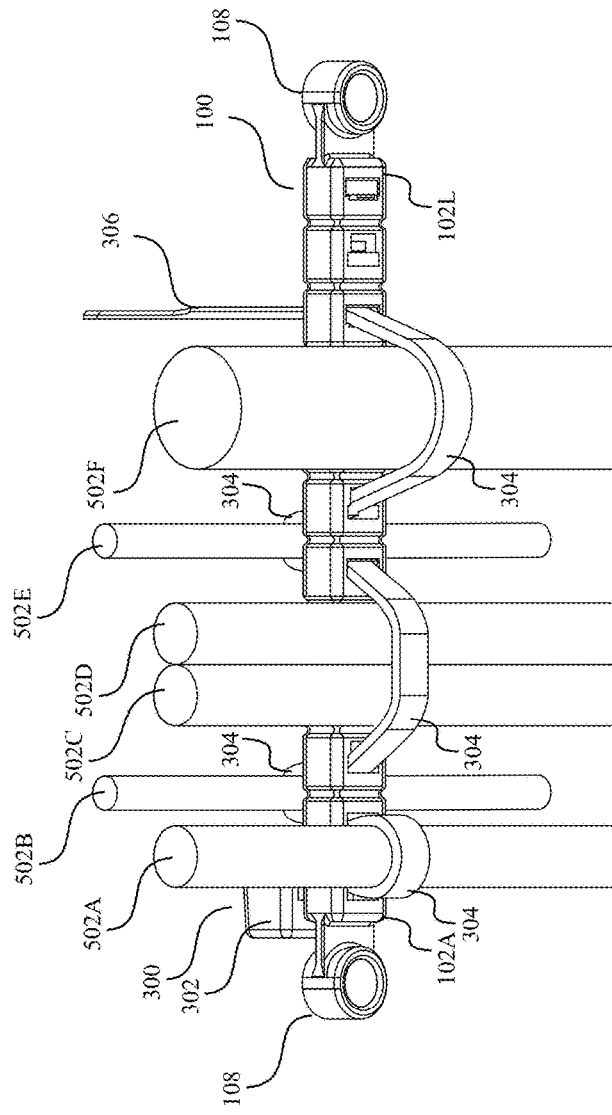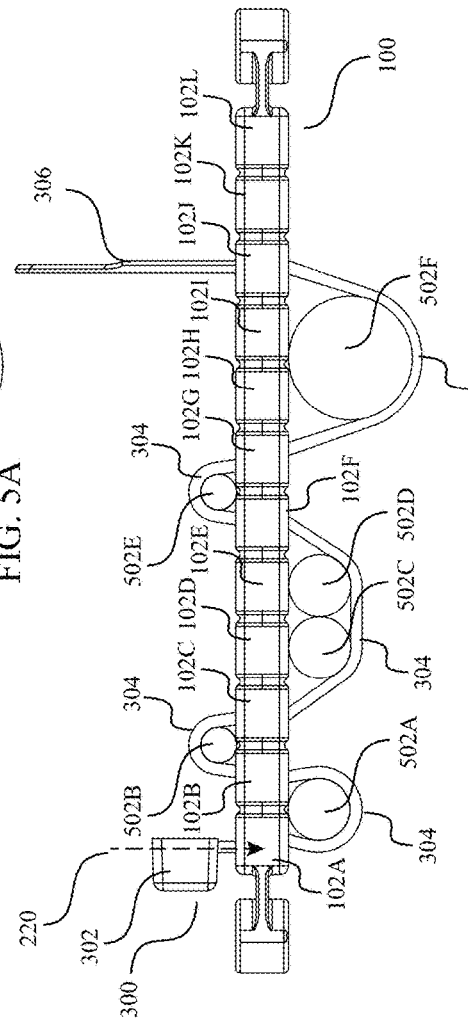
FIG. 5A
FIG. 5B

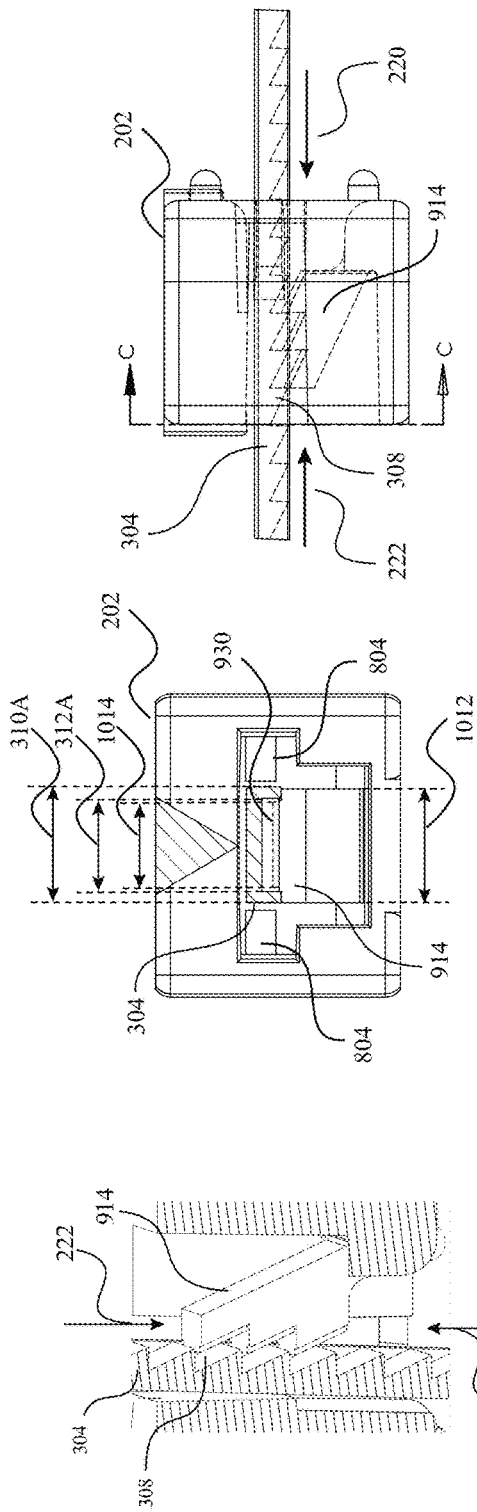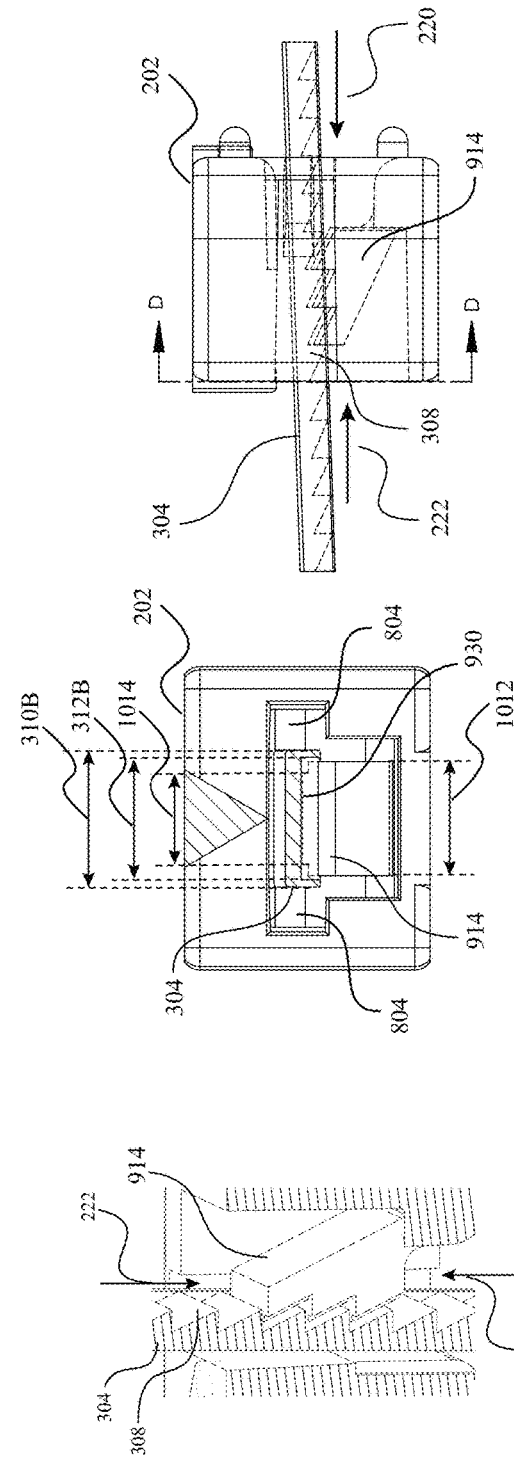

DEVICE FOR CABLE MANAGEMENT

REFERENCE TO RELATED APPLICATIONS

This application claims the benefit of U.S. Provisional Application No. 63/311,091, filed Feb. 17, 2022, the contents of which are incorporated herein by reference.

FIELD OF THE INVENTION

The present invention relates to management of cables and wires. More particularly, the present invention relates to a device for organizing cables and wires using conventional zip ties.

BACKGROUND OF THE INVENTION

Many domestic, commercial and industrial appliances and machineries require installation of a large number of wires or cables. For example, electronic appliances used at households, automobiles and aircrafts in transportation industry and construction machineries need numerous wire or cable connections. Due to the presence of such large number of cables, often passing through narrow passages, possibility of the cables getting mixed up and entangled with each other remains high. Such a situation may cause damage to cables and increase risks of electrical short-circuit and fire. Accessing an unorganized bunch of cables or wires for inspection or repair purpose is not only difficult but also is a safety hazard. In addition, separating intertwined cables and maintaining their order is a very challenging task.

There are many products available in the market for organizing and managing wires and cables. One of the simplest solutions is the cable ties or zip ties which are widely used for tying up all the cables together. But, conventional use of zip ties does not address the above-mentioned problems. Another solution is use of cord clips which allows securing a bunch of cables together against a support surface. Then there are also devices available which do allow cables or wires to be organized in an orderly manner and subsequent removal of any individual cable or wire from a bunch. But, these solutions are either expensive or difficult to use in organizing cables or wires when cost and convenience are considered as selection criteria. Also, existing cable management devices are meant for specific use only and, thus, lack versatility.

Thus, there exists a requirement for a device which overcomes the aforesaid drawbacks associated with management of cables and wires.

OBJECTS OF THE INVENTION

An object of the present invention is to provide a device for organizing cables and wires to increase neatness and safety.

Another object of the present invention is to provide a device for convenient organization and management of cables and wires.

Yet another object of the present invention is to provide a device which allows making of multiple loops for securing cables with a single conventional zip tie.

Another object of the present invention is to provide a device for cable management which allows easy access to individual cables to work on and enables identification of each individual cable.

Still another object of the present invention is to provide an inexpensive cable organizer.

Yet another object of the present invention is to provide a cable organizer which enables easy addition and removal of a cable to and from a bunch of cables without disturbing the other cables.

Still another object of the present invention is to provide a cable organizer which holds the cable physically separated from each other to mitigate electrical and thermal interference.

Another object of the present invention is to provide a device which can be cut to length as per requirement.

Yet another object of the present invention is to enable use of conventional zip ties of different sizes with a single cable organizer.

SUMMARY OF THE INVENTION

The following presents a simplified summary in order to provide a basic understanding of some aspects of the disclosed invention. This summary is not an extensive overview, and it is not intended to identify key/critical elements or to delineate the scope thereof. Its sole purpose is to present some concepts in a simplified form as a prelude to the more detailed description that is presented later.

The device or apparatus of the present invention supports and retains cables or wires in a manner that allows the cables or wires to be organized tidily and orderly. The device comprises one or more fastening heads held together by connecting members. Each of the fastening heads has an aperture that extends from a top side to a bottom side of a head body of the fastening heads. One or more pawls are provided to extend away from a first wall of the aperture. Each pawl has one or more teeth disposed on its face oriented toward a second wall opposite to the first wall. The aperture and the pawl disposed therein are adapted and dimensioned to receive and permit an elongated strap of a conventional cable tie to be pushed or pulled through the aperture in a forward direction with the strap teeth ratcheting over the pawl teeth so that, when the elongated strap of cable tie is pulled or pushed in a reverse direction, at least one pawl tooth will urge the strap teeth into locking engagement. Each of the one or more pawl teeth comprises an engagement region having a leading edge oriented inwardly toward a second wall opposite to the first wall of the aperture and a flank region extending downwardly from the leading edge to meet the engagement region of another pawl tooth. The engagement region is configured for the engagement between the pawl teeth and the strap teeth. The engagement region further comprises a base contact region having a first width, and a frontal contact region having a second width narrower than the first width measured along the leading edge. The frontal contact region is dimensioned and shaped to extend beyond the base contact region toward the second wall and the second width of the frontal contact region is configured to be narrower than a width of the strap teeth of conventional cable ties/straps.

In one of the many possible combinations of aperture direction orientations, the fastening heads or the apertures in one embodiment of the device are so arranged that the entrances to two adjacent apertures face opposite directions. One or more cables or wires can be secured to the device by passing a conventional cable tie through any two of the fastening heads of the device. A flexible alignment guide disposed on the head body biases the conventional cable tie or elongated strap into an alignment with the face of the pawl for the engagement between the one or more pawl teeth and the strap teeth. The flexible alignment guide comprises one or more flexible elements angularly extending from one or more of the aperture walls into the aperture. Each of the one or more flexible elements has a free end adapted to extend along the first direction i.e. along the direction of entry of the strap.

Any two fastening heads for making the loop can be chosen based on the number or diameter of the cable(s) to be secured. Since, a typical device of the present invention is intended to have a plurality of fastening heads lined up linearly, a bunch of cables can be tied to the device with the help of one or more conventional cable ties in an orderly manner with no overlapping. Any of the cables kept tied to the device can be removed by simply cutting the loop holding the cable without disturbing the order or sequence in which the other cables are secured to the device.

BRIEF DESCRIPTION OF DRAWINGS

The accompanying drawings, which are incorporated herein and form a part of the specification, illustrate the present invention and, together with the description, further serve to explain the principles of the invention and to enable a person skilled in the relevant art to make and use the invention. The present invention will become more fully understood from the detailed description given herein below and the accompanying drawings which are given by way of illustration only, and thus are not limitative of the present invention, and wherein:

FIG. 5A illustrates a front perspective view of the device for cable management securing cables in linear order in accordance with an embodiment of the present invention;

FIG. 5B illustrates a front view of the device for cable management securing cables in linear order in accordance with an embodiment of the present invention;

FIG. 11A is a front sectional perspective front view of a fastening head showing interaction between the teeth of the pawl and the teeth of a relatively thin strap;

FIG. 11B is a sectional view taken along a line C-C of FIG. 11C showing interaction between the teeth of the pawl and the teeth of a relatively thin strap;

FIG. 11C is a side view of a fastening head showing interaction between the teeth of the pawl and the teeth of a relatively thin strap;

FIG. 11D is a front sectional perspective view of a fastening head showing interaction between the teeth of the pawl and the teeth of a relatively thick strap;

FIG. 11E is a sectional view taken along a line D-D of FIG. 11F showing interaction between the teeth of the pawl and the teeth of a relatively thick strap;

FIG. 11F is a side view of a fastening head showing interaction between the teeth of the pawl and the teeth of a relatively thick strap;

DETAILED DESCRIPTION OF THE INVENTION

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the scope of the present invention. Thus, the present invention is not intended to be limited to the embodiments shown, but is to be accorded the widest scope consistent with the principles and features disclosed herein.

Figure 7:
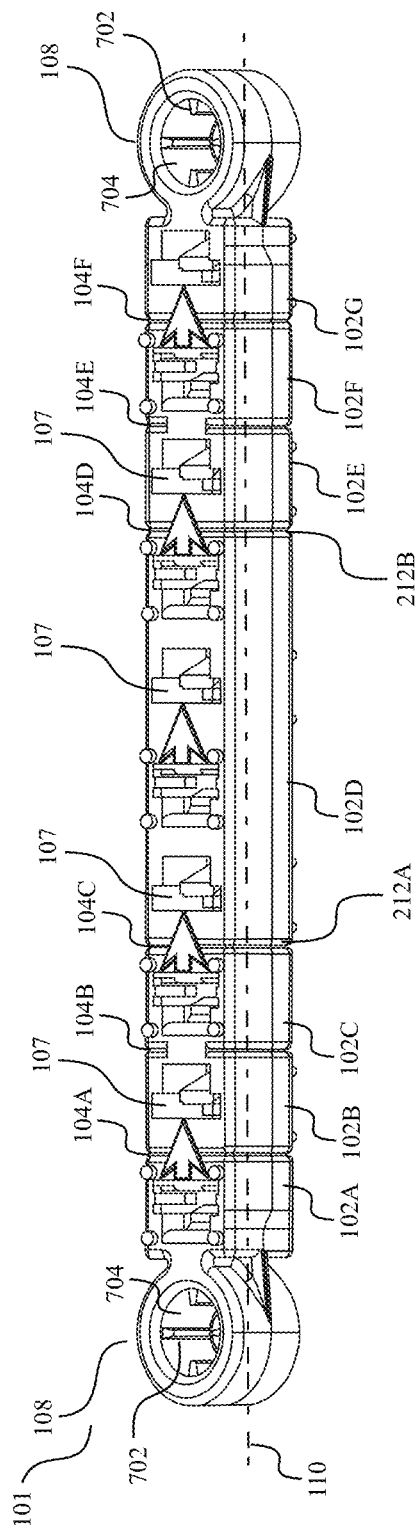
FIG. 7 illustrates a front perspective view of a second embodiment of the device for cable management of the present invention.

Reference to FIGS. 1, 2A, 2B, 7 and 8A-8B the device 100 or 101 for cable management comprises a plurality of locking/fastening heads 102 (locking heads 102A-102L as in FIG. 1 or 102A-102G as in FIG. 7, for example). Each of the fastening head 102 may be connected to each other by connecting members 104 (connecting members 104A-104K as in FIG. 1 or 104A-104F as in FIG. 7, for example). Each of the fastening heads 102 comprises a head body 202 having an outer surface 204 and one or more inner surfaces 206, and one or more pawls 214 or 914. The outer surface 204 defines a top/first side 208, an opposite bottom/second side 210 and end sides 212 (212A and 212B) of the head body 202. These sides of the outer surface 204 together may give the fastening heads 102 any geometric shape such as cube shape, cuboid shape or cylindrical shape etc. Each of the inner surfaces 206 defines a plurality of walls such as first wall 213, second wall 215 and side wall 217 which cooperatively form an aperture or channel or passageway 106 thereamong which extends, generally transverse to the longitudinal axis 110 of the device 100, through the head body 202 from the top/first side 208 to the bottom/second side 210. Aperture 106 may include an entrance 209 having a countersink region which slopes inward and toward the aperture 106 from the top side 208 to facilitate centering, and an exit 211 extending from the bottom side 210.

Figure 1:
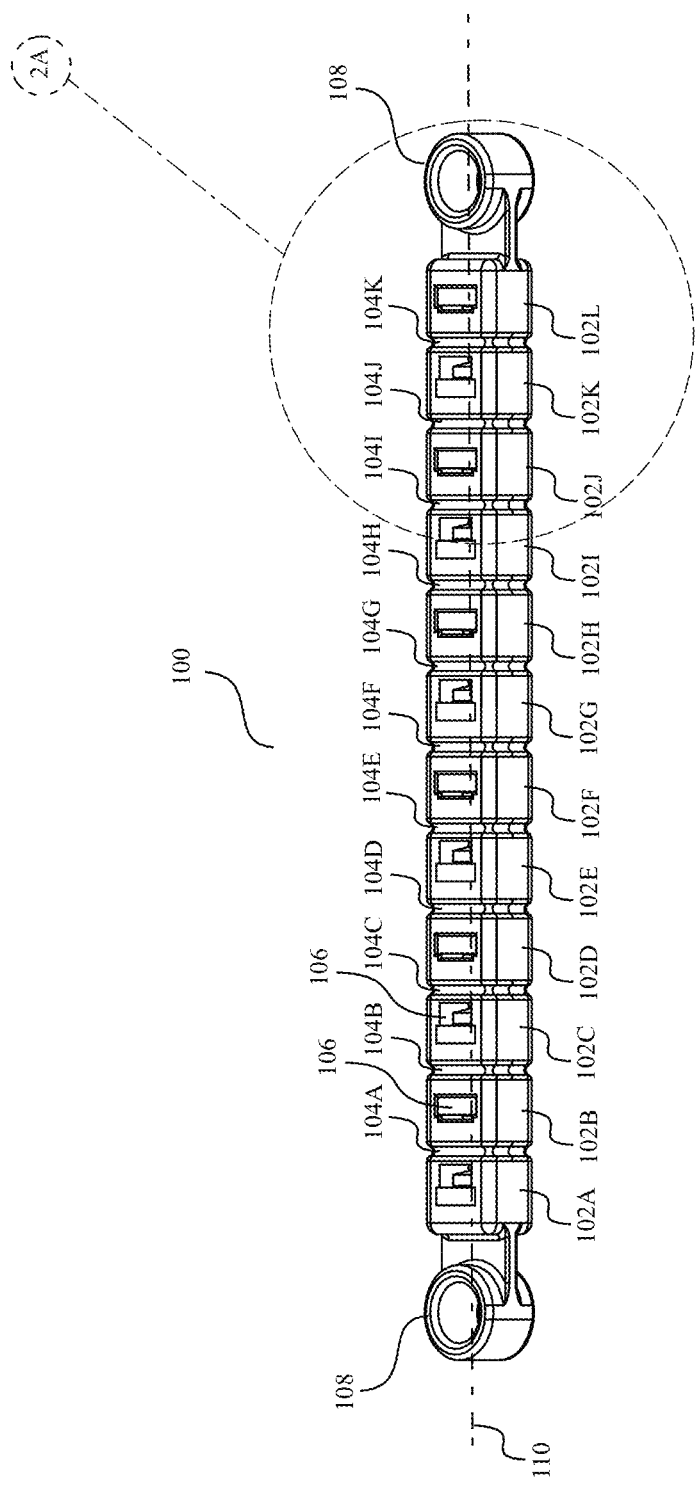
FIG. 1 illustrates a front perspective view of the device for cable management in accordance with an embodiment of the present invention.
Figure 2:
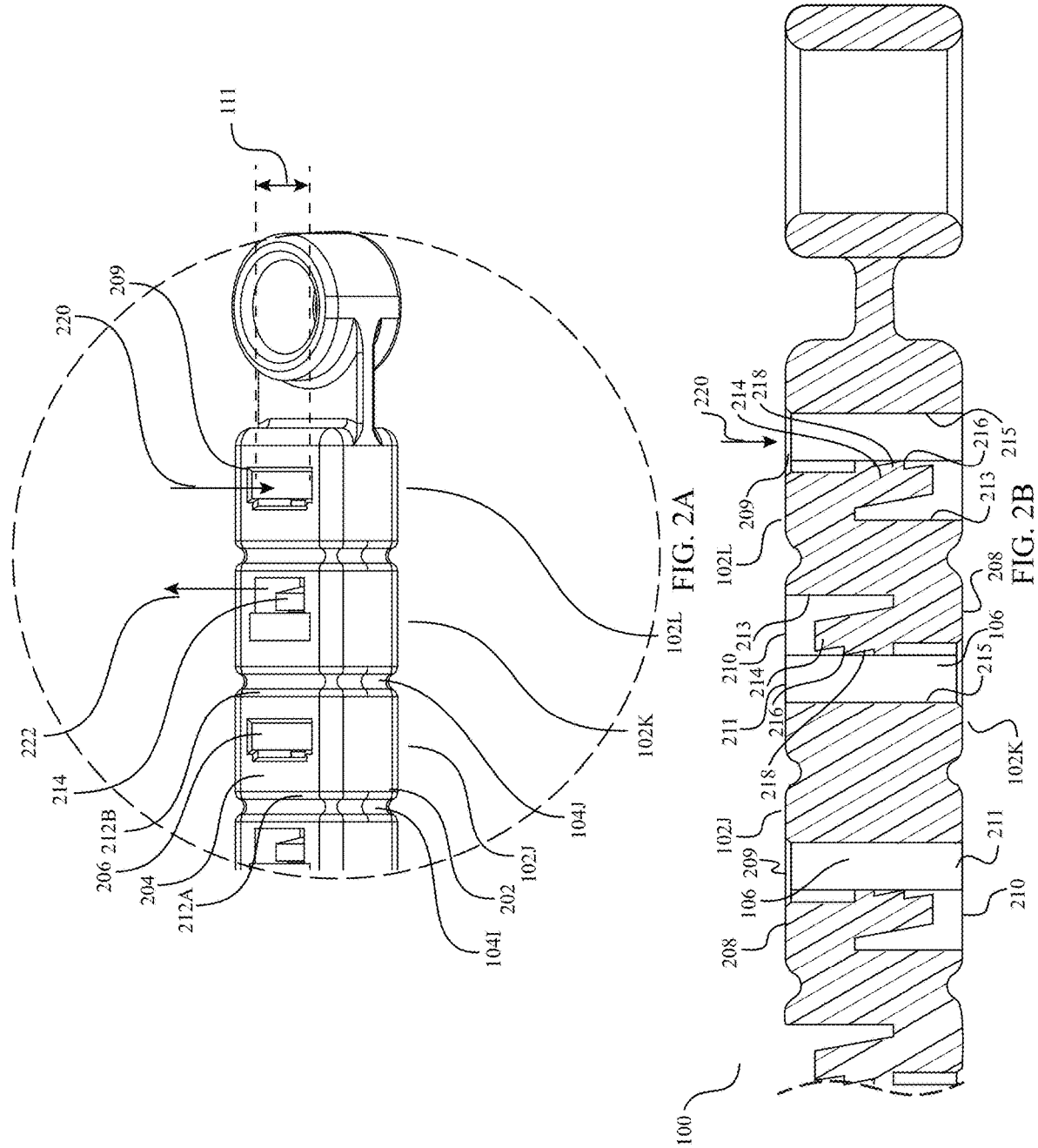
FIG. 2A shows an enlarged view of a portion of the device for cable management as illustrated in FIG. 1 and identified as detail 2A in FIG. 1.
FIG. 2B illustrates a longitudinal-section view of the portion of the device for cable management shown in FIG. 2A.
Figure 3:
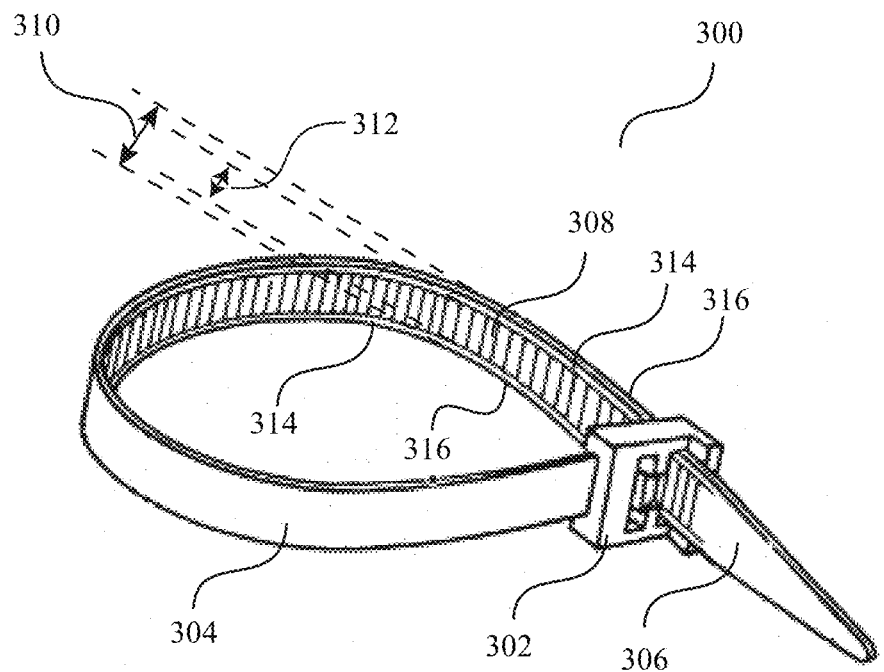
FIG. 3 illustrates a perspective view of a conventional or prior art zip tie or cable tie.

In the context of the present invention, as illustrated in FIG. 3, a conventional/prior art zip tie or cable tie 300 is a fastener which typically comprises an elongated flexible strap 304 (hereinafter referred to as elongated strap 304 or strap 304) having an integral head 302 extending from one end of the strap 304 and a free end 306 at the other end of the strap 304. A plurality of teeth or serrations 308, hereinafter referred to as strap teeth 308, are disposed at least on one side of the strap 304. The strap width/thickness 310 is the width measured between the lateral ends of the strap 304. As shown in FIG. 3, in conventional zip ties/straps 304, the strap teeth 308 do not extend laterally up to the edges 316 of the strap 304 as side rails 314 run along the strap 304 longitudinally. Thus, in conventional straps 304, the strap teeth width 312 is less than the overall strap width 310 i.e. strap teeth width 312 is narrower than the strap width 310.

In some embodiments, as shown in FIGS. 2A and 2B, the aperture 106 defined by the plurality of aperture walls has a substantially quadrilateral cross-section with at least two opposite substantially parallel sides—the first aperture side/first wall 213 and the second aperture side/second wall 215, which form aperture width 111 of the cross-section of the aperture 106. Height of the cross-section of the aperture 106 is measured perpendicular to the width 111 of the aperture 106. In a preferred embodiment, the cross-section of the aperture 106 is substantially rectangular in shape. However, the corners of the substantially rectangular aperture may not be sharp and, thus, the overall cross section of aperture could then be considered obround, trapezoidal, or any general shape where the width is generally greater than the height. Irrespective of the shape, aperture 106 is configured to have an aperture width 111 sufficient to receive therethrough the elongated strap 304 having a strap width 310.

As shown in FIGS. 2A-2B, 8A-8C, 9 and 10A-10B, a hingedly movable pawl 214 or 914 extends from the first aperture side/first wall 213 toward the second wall 215 at least partially into the aperture 106. In a preferred embodiment, the base of the pawl starts from the juncture of the top side 208 and the first aperture side 213 and then extends inward to the aperture 106 with the face 218/918 of the pawl 214/914 oriented toward the aperture 106 away from the first aperture side/first wall 213. The base of the pawl 214 is configured to have an optimal thickness so that it is strong enough to provide sufficient strength to the pawl 214/914 to withstand any thrust exerted on the face in the reverse direction/second direction and, at the same time, it enables the pawl face 218/918 to pivotally, flexibly or resiliently move away from the passageway/aperture 106 when a force is exerted on the face 218/918 in the forward/first direction 220 from the entrance 209.

As shown in FIGS. 2B, 8A-8C and 9, one or more teeth 216 or 916 are disposed on the face 218 or 918 of the pawl 214 or 914. The aperture 106 is so dimensioned that it can receive an elongated strap 304 of a conventional cable tie and, within the aperture 106, the face 218/918 of the pawl 214/914 exerts a biasing force against the strap teeth 308 of the elongated strap 304. The pawl teeth 216/916 are adapted to be complementary to the strap teeth 308 of the elongated strap 304 so that the teeth from both the sides can cooperate to lock a portion of the elongated strap 304 within the aperture 106 and prevent the strap 304 from being withdrawn in the reverse/second direction 222 i.e. from being withdrawn in a direction opposite to the direction of insertion (first direction) of the strap 304 into the aperture 106. The pawl teeth 216/916 can have wide range of tooth depth and pitch. As per a second embodiment, as shown in FIGS. 8A-8C, 9, 10A-10B and 11A-11F, each of the one or more pawl teeth 916 comprises an engagement region 920 having a leading edge 922 oriented inwardly toward the second wall 215 and a flank region 920 extending downwardly from the leading edge 922. The engagement region 920 is configured for the engagement between the pawl teeth 916 and one or more of the plurality of strap teeth 308. The engagement region 920 further comprises a base contact region 928 having a first width 1012, and a frontal contact region 930 having a second width 1014 narrower than the first width 1012 measured along the leading edge 922. The frontal contact region 930 is dimensioned and shaped to extend beyond the base contact region 928 toward the second wall 215. Also, the second width 1014 of the frontal contact region 930 is configured to be narrower than the strap teeth width 312 of the strap tooth 308 of the conventional straps 304.

In the present example of the second embodiment 101, the extended frontal contact region 930 gives the pawl teeth 916 a stepped-edge profile. However, the frontal contact region 930 may be of any other shape which extends beyond the base contact region 928 in the direction of the second wall 215 of the aperture 106. In all of such shapes, this jagged or stepped pawl teeth design, as illustrated in FIGS. 8A-8C, 9, 10A-10B and 11A-11F, enables use of straps 304 of different width/thickness 310 with the same apparatus of the present invention. For example, as shown in FIGS. 11A-11C, even when the strap teeth width 312A is less than the first width 1012 i.e. the width of the overall pawl, the locking between the strap 304 and the pawl 914 will occur as the frontal contact region 930 will engage with the strap teeth 308 as the width of the frontal contact region i.e. second width 1014 is narrower than the strap teeth width 312A. In the other instances, if the strap teeth width 312B is wider than the first width 1012 of the pawl 914 then the locking will obviously happen as the frontal contact region 930 and the base contact region 928 of the engagement region 920 will both interact with the strap teeth 308 as shown in FIGS. 11D-11F.

As strap 304 of different thickness/width can be used with the same device 100/101 of the present invention, it is essential that the strap teeth 308 and the pawl teeth 916 remain aligned with each other along the longitudinal axis of the strap 304 once it is inserted into the aperture 106. For this purpose, reference to FIGS. 8C, 9, 10A-10B, 11B and 11E, a flexible alignment guide 804 is disposed on the head body 202. The flexible alignment guide 804 is configured to apply a biasing force to urge the elongated strap 304 into alignment with the face of the pawl 914 for the engagement between the one or more pawl teeth 916 and the one or more of the plurality of strap teeth 308. The flexible alignment guide 804 comprises one or more flexible elements (804A, 804B etc., for example) angularly extending from one or more of the plurality of walls (from wall 217, for example) into the aperture 106. Each of the one or more flexible elements has a free end 806 adapted to extend along the first direction 220. These free ends 806 flex to apply said biasing force on the elongated strap 304 to keep the strap 304 aligned with the pawl face or pawl teeth 916 when the strap 304 remains inserted in the aperture 106.

The fastening heads 102 are connected to each other on the end sides 212 by the connecting members 104 such that the fastening heads 102 are positioned one after another along or laterally to the longitudinal axis 110 of the device 100/101. The connecting members 104 are configured to be deformable to alter the orientation in response to an applied force or are configured to be robust depending on application types. Accordingly, a rigid version of the device 100/101 can be supplied in different geometric shapes (circular, semi-circular or any other curved shapes, for example) or such shapes can be achieved by bending the device 100/101 at various angles in case of a semi-rigid/flexible version of it. In a preferred embodiment, a flexible connecting member 104 is dimensioned to have a width narrower than the width of the fastening heads 102. The device 100/101 can be made available with connecting members 104 having equal or different lengths so that the fastening heads 102 remain disposed longitudinally spaced apart at desired distance from each other based on requirement. The device 100/101 can be bent to a position where all of the fastening heads 102 remain essentially on one plane or can be bent out of plane around axes that are perpendicular to the long length of the strip of segments. It can also be bent out of the plane of the device 100/101 by twisting a pair of adjacent fastening heads 102 relative to each other around an axis parallel to the longitudinal axis 110. Flexibility provided by the connecting members enables the device 100/101 to be used in a greater variety of situations.

The fastening heads 102 of the device 100/101 can be arranged spaced apart from each other along the longitudinal axis 110 in different sequences in terms of the direction of the apertures/passageway 106 of the fastening heads 102. For example, as illustrated in FIGS. 1-6, the fastening heads 102 can be arranged in an alternating sequence with the top sides 208 of the fastening heads 102 lying on the same plane and the entrances 209 to the apertures 106 of two consecutive fastening heads 102 facing opposite directions to one another. This kind of array of oppositely facing fastening heads 102 lets cables to be arranged on either side of the device 100/101. In some embodiments, the entrances 209 of two adjacent fastening heads 102 may be arranged at any angular/rotational position about the longitudinal axis 110 for specific applications. For example, fastening heads 102 with aperture directions oriented perpendicular to each other can help in securing non-parallel cables. In some embodiments, the connecting members 104 are configured to remain at any angular/rotational position with respect to each other when twisted or bent by a user within an allowable limit. This feature facilitates cables running in different directions to be managed in an orderly manner without affecting the intended cable directions.

Figure 8A:
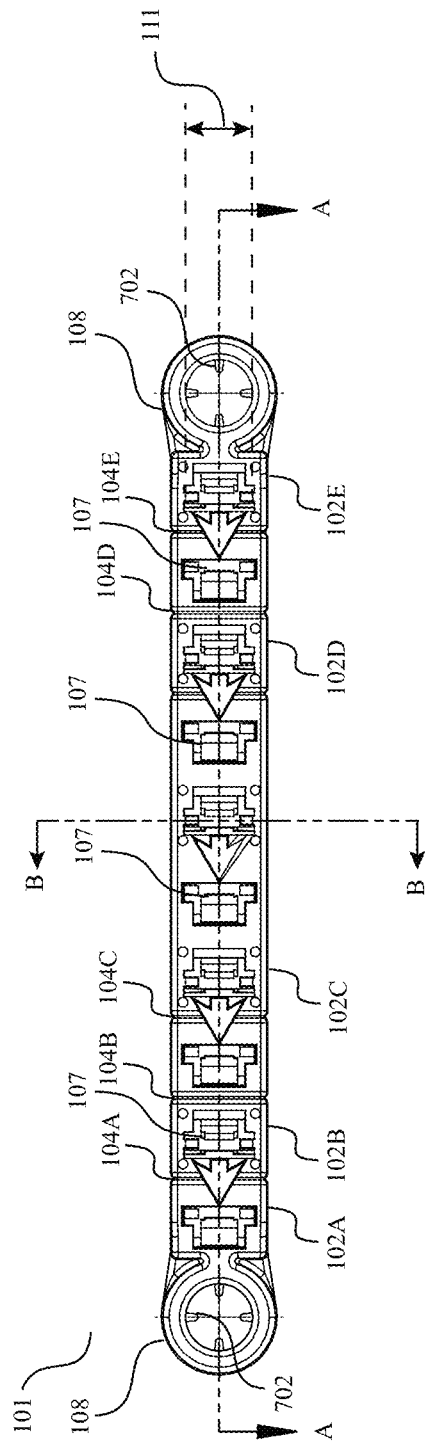
FIG. 8A illustrates a top view of the second embodiment of the device for cable management of the present invention.
Figure 8C:
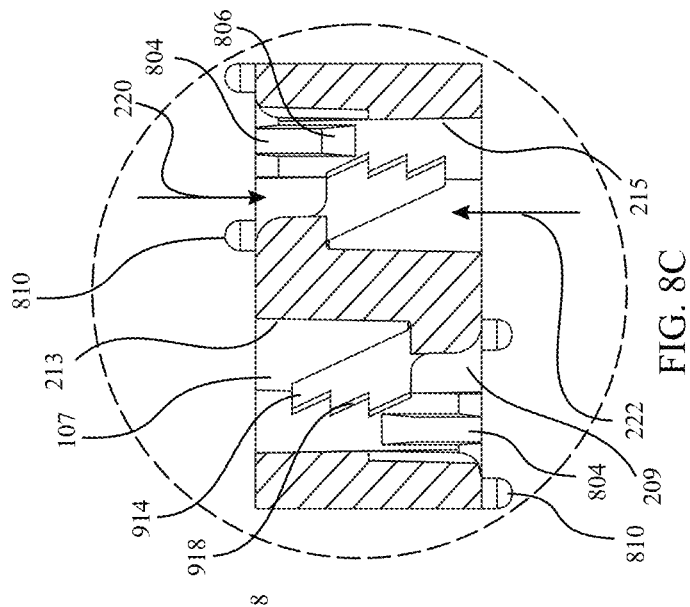
FIG. 8C shows an enlarged view of a portion of the second embodiment of the device as illustrated in FIG. 8B and identified as detail 8C in FIG. 8B.
Figure 8B:
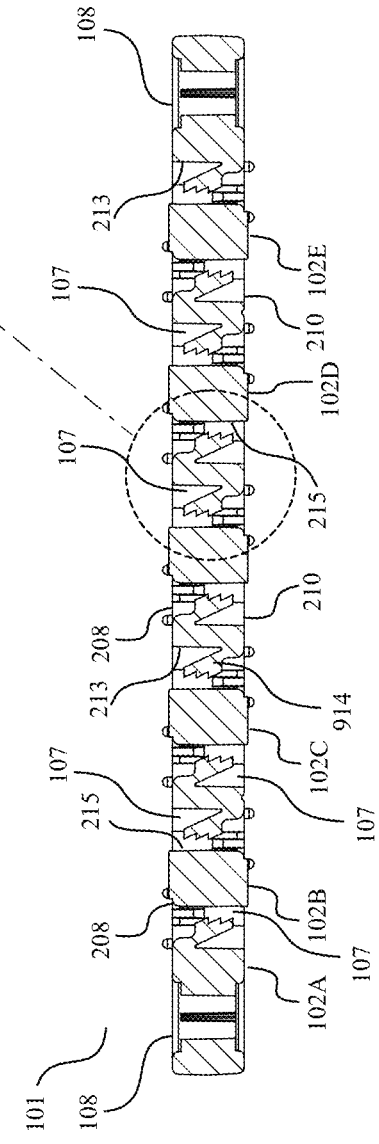
FIG. 8B illustrates a sectional view of the second embodiment of the device taken along a line A-A of FIG. 8A.
Figure 9:
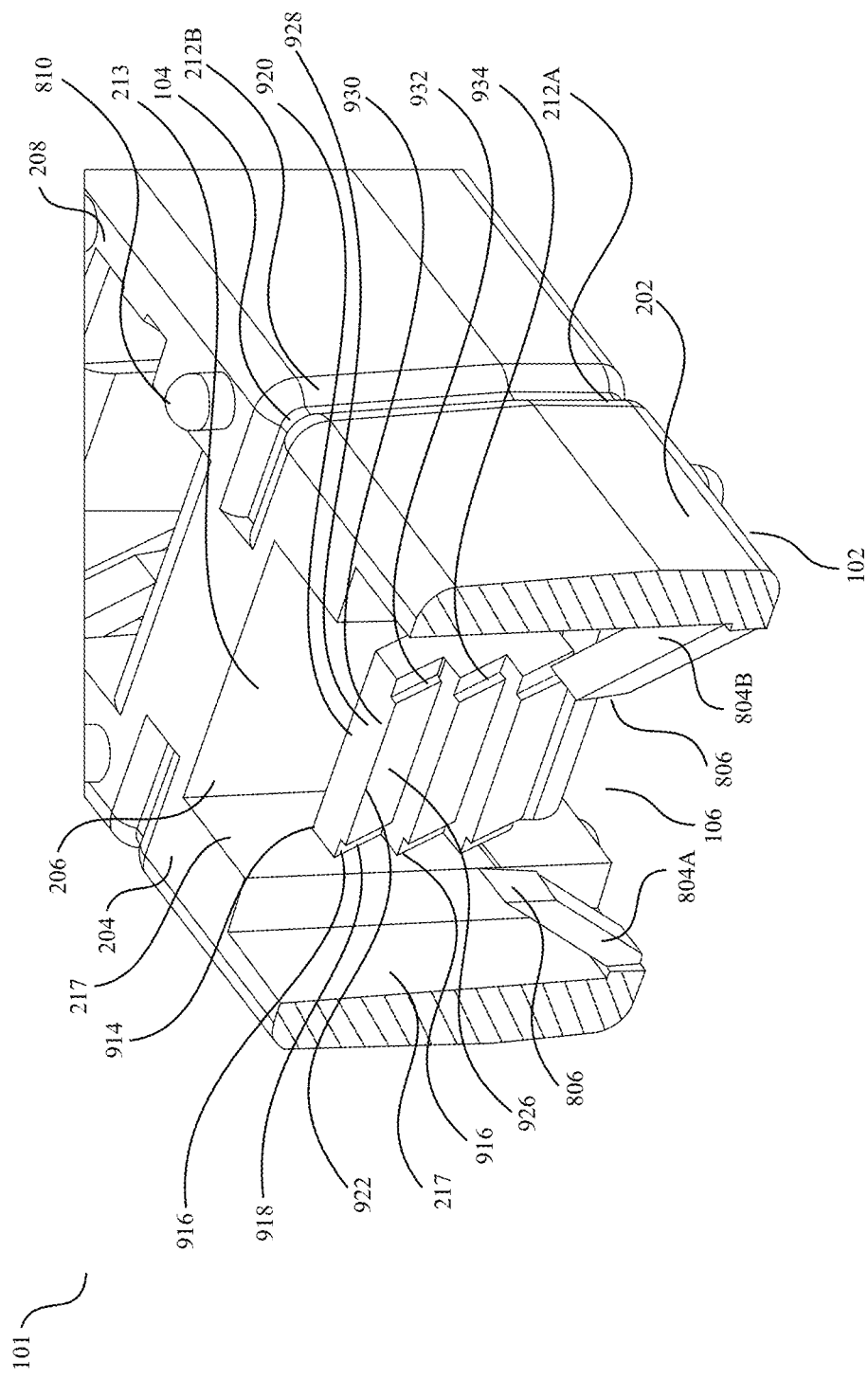
FIG. 9 illustrates a sectional perspective view of the second embodiment of the device taken along a line B-B of FIG. 8A.
Figure 10B:
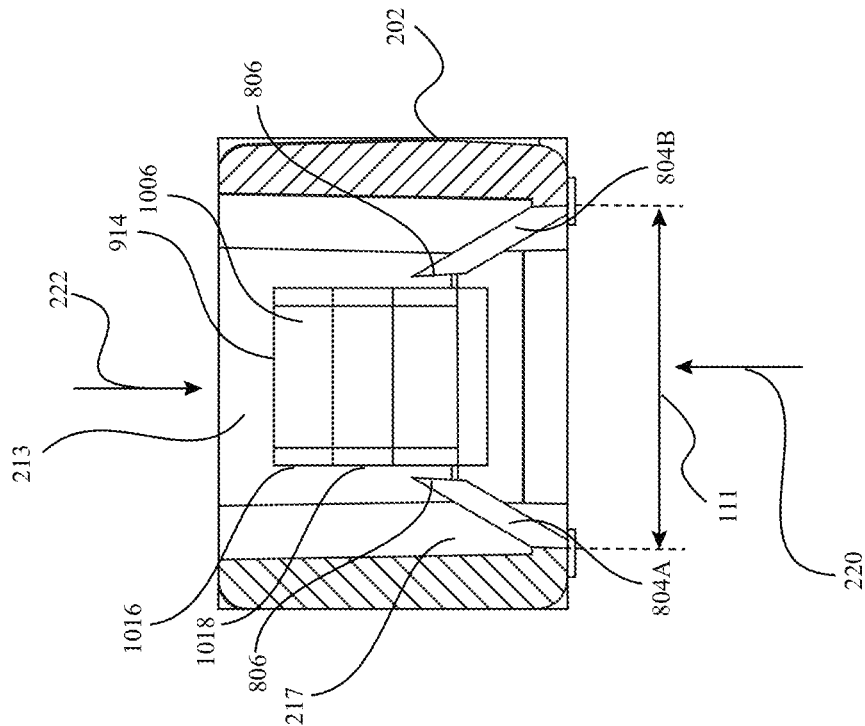
FIG. 10B illustrates a sectional view of the second embodiment of the device taken along a line B-B of FIG. 8A.
Figure 10A:
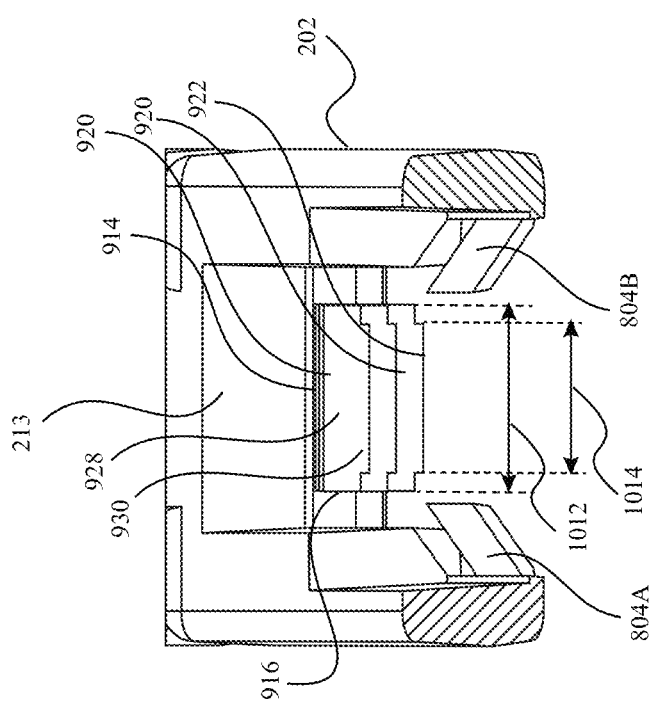
FIG. 10A illustrates a sectional perspective view of the second embodiment of the device taken along a line B-B of FIG. 8A.
Figure 12A:
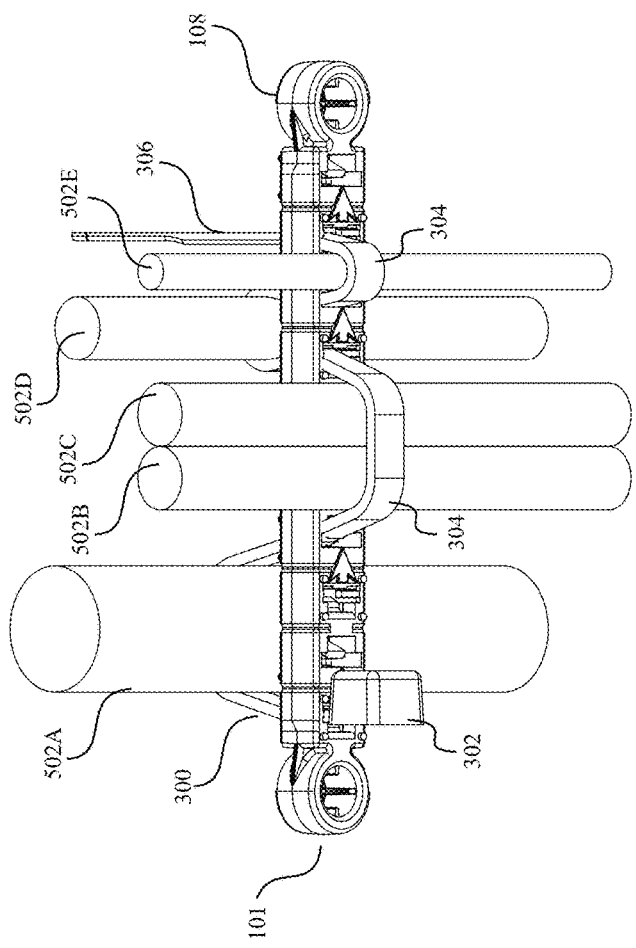
FIG. 12A illustrates a front perspective view of the second embodiment of the zip tie device securing cables in linear order.
Figure 12B:
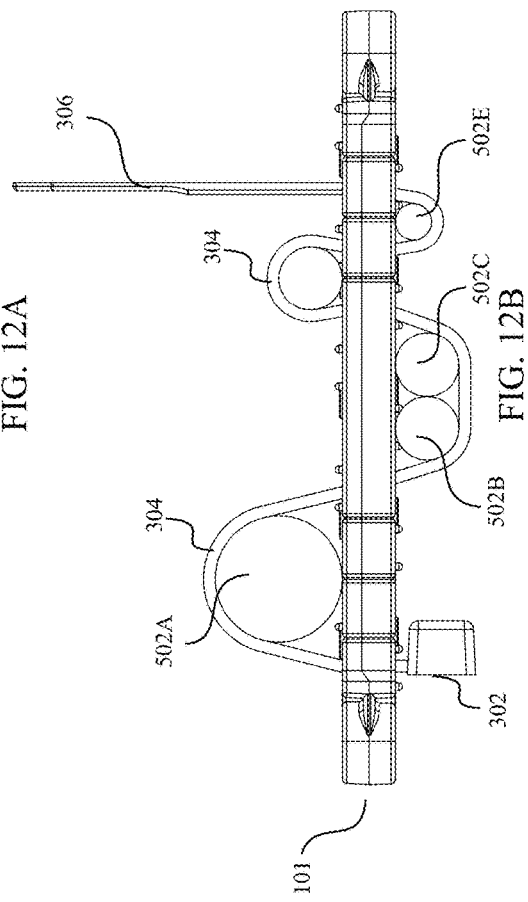
FIG. 12B illustrates a front view of the second embodiment of the zip tie device securing cables in linear order.

In typical embodiments, the length of the device 100/101 might vary from about a few inches to several inches, and the device 100/101 itself can be adaptively configured to a desired length by merely severing/cutting, twisting or tearing any of the connecting members 104. In some embodiments, as shown in FIGS. 1-14, a fixing end 108 is disposed at the end sides of each of the outermost fastening heads (102A and 102L in FIGS. 1 and 102A and 102G in FIG. 7 of the present example) in a row of fastening heads 102 interconnected by connecting members 104. The fixing ends 108 are adapted to facilitate fixing or securing of the device 100 for cable management to a support structure. For example, screws or fastening ties can be inserted through the fixing ends to secure the device 100 to a support structure. In some embodiments, as shown in FIGS. 7 and 8A, a plurality of ribs 702 extend radially inwardly from the internal wall 704 of the fixing end 108. These ribs 702 support and align a fastener (a screw, for example) during mounting of the device 100/101 onto a surface of a support structure.

Figure 4:
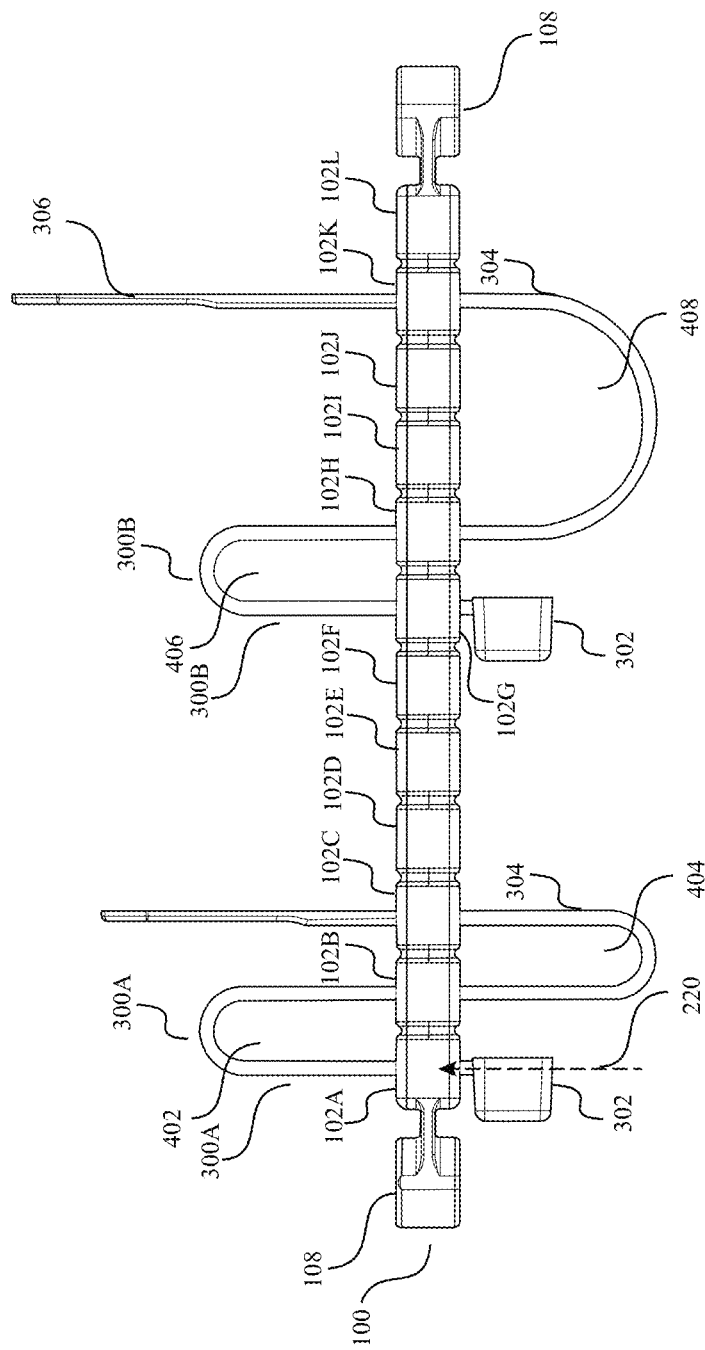
FIG. 4 illustrates a front view of the device for cable management with multiple zip ties engaged in accordance with an embodiment of the present invention.
Figure 13:
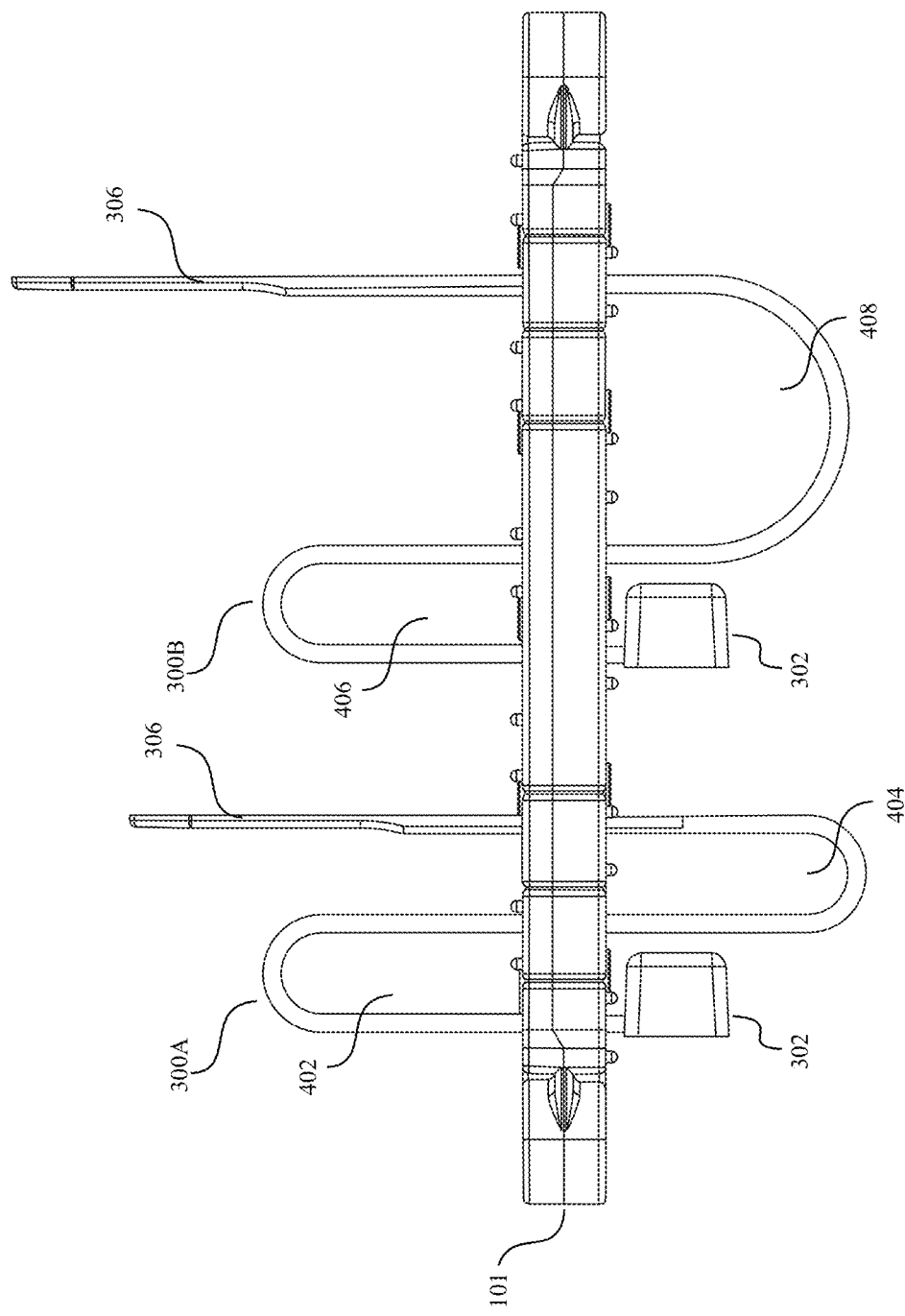
FIG. 13 illustrates a front view of the second embodiment of the zip tie device with multiple zip ties engaged.
Figure 14:
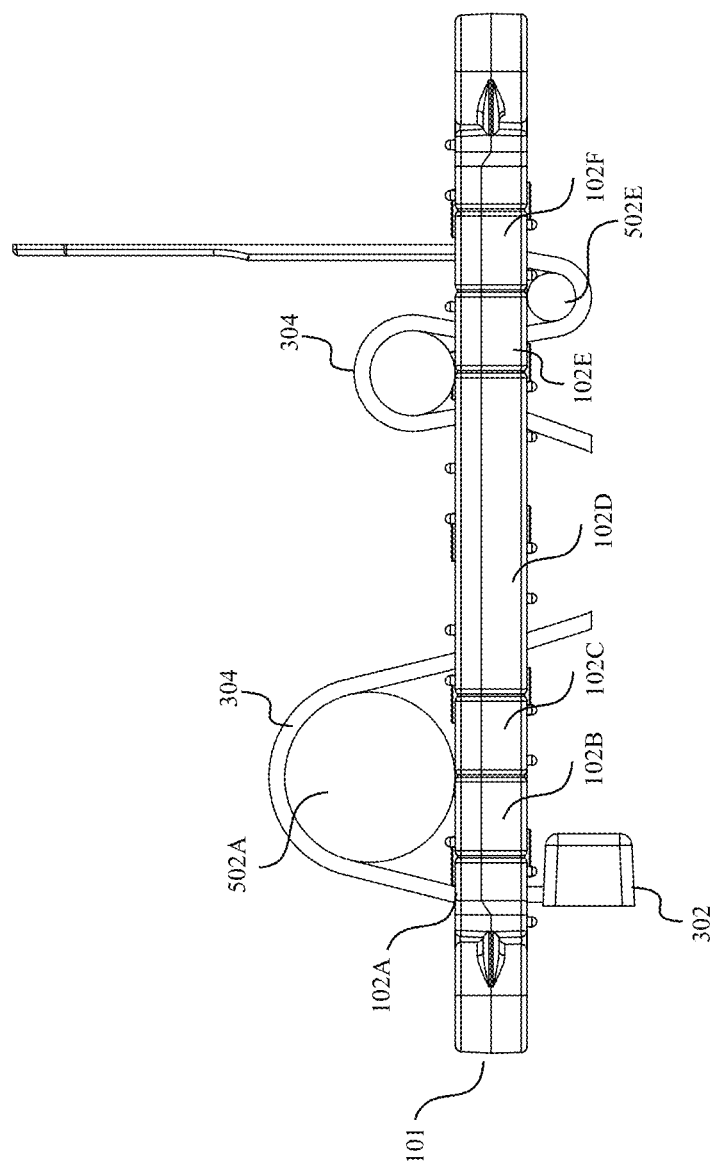
FIG. 14 illustrates a front view of the second embodiment of the zip tie device with one of the secured cables removed.

The device 100 of the present invention enables management of elongated bodies such as cables or wires by securing them in a desired order with the help of one or more conventional cable ties 300. For use, as shown in FIGS. 4-6 and 12-14, a free end 306 of a conventional cable tie 300 can be inserted through the entrance 209 of an aperture 106 of a first fastening head 102A of the device 100. The strap 304 is then pushed or pulled through the aperture 106 and looped around back toward another aperture 106 of a second fastening head 102B which may be located immediately next to the first fastening head 102A or may be located at a desired number of fastening heads 102 away from the first fastening head 102A. Subsequently, the strap 304 can be inserted through a third fastening head 102C to form a second loop. The looping action can be continued with the same conventional cable tie 300 or one or more additional conventional cable ties 300 can be used for the same purpose. While FIGS. 4 and 13 show use of two conventional cable ties 300A and 300B for forming multiple loops 402, 404, 406 and 408, FIGS. 5-6 and 12A-12B illustrate mounting of a single cable tie 300 on device 100/101 for making the multiple loops.

Reference to FIGS. 5A-5B and 12A-12B, in an exemplary scenario, multiple cables or wires 502 (502A to 502F in FIGS. 5 and 502A-502E in FIG. 12) are shown to have been organized neatly with the device 100 of the present invention. To achieve this, the free end 306 of the strap 304 is inserted through the entrance 209 (shown in FIGS. 2A and 2B) of the first fastening head 102A in the forward direction 220. Strap 304 is then pulled or pushed forward through the aperture 106, looped around cable 502A and passed through the aperture 106 of the fastening head 102B (entrances to apertures of adjacent fastening heads face in opposite directions in this example). Further pushing or pulling of the strap 304 through the second fastening head 102B decreases the size of the closed loop formed by the strap 304. At this position of the strap 304 the sets of strap teeth 308 and at least one pawl tooth 216 engage each other in an interlocking relationship within the respective apertures 106 of the fastening heads 102A and 102B. As the strap 304 is pulled tightly around the cable 502A, the interlocking between the strap teeth 308 and pawl teeth 216 prevents the strap 304 from slipping backward to any significant extent. Head 302, which is integral to the strap 304, engages with bottom side 210 (shown in FIG. 2B) of the fastening head 102A and acts as a mechanical stop to prevent the strap 304 from slipping out of the aperture 106 in the forward direction when the strap 304 is pulled through the fastening heads.

Continuing with the present example, the strap 304 is then passed through the aperture 106 of the next fastening head 102C to form a second loop to secure cable 502B on the other side of the device 100/101. FIGS. 5A and 5B show a further looping of strap 304 between fastening heads 102C and 102F passing over fastening heads 102D and 102E to secure two cables 502C and 502D together. This is an example of making loops of different sizes with the strap 304 to secure cables of different diameters or to secure more than one cable together in a single loop, as per requirement. Cable 502E is then secured to the device 100/101 by making another loop with the strap 304 passing through fastening head 102G. If there is no further cable to be secured then the device 100/101 is left with five fastening heads 102H to 102L unutilized and available for future use. For example, if required, cable 502F can be added to the device 100/101 without disturbing the order or sequence of other cables already secured to the device 100/101. The sequence of arranging cables depicted in the drawings is only one of many ways to manage multiple cables using the device 100/101.

Figure 6:
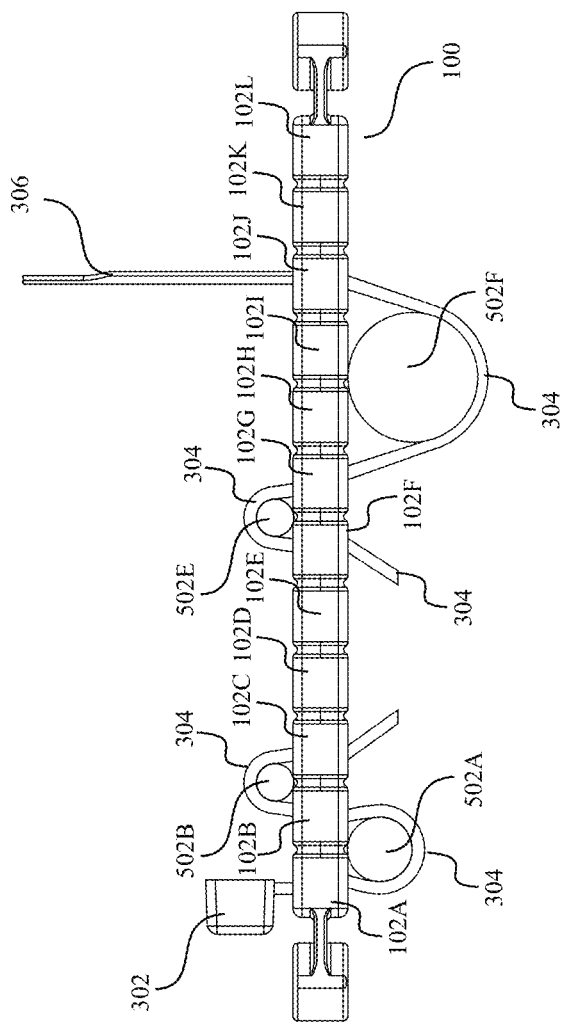
FIG. 6 illustrates a front view of the device for cable management with one of the secured cables removed in accordance with an embodiment of the present invention.

If required, any of these cables 502 can be removed from the device 100/101 by simply cutting the strap 304 to open the loop that wraps around the intended cable 502. FIG. 6 shows strap 304 cut between fastening heads 102C and 102F (between 102C and 102D in FIG. 14) wherein cables 502C and 502D (502B and 502C in FIG. 12B) were previously kept tied to the device 100/101 as shown in FIG. 5/FIG. 12. Since, the strap 304 is prevented from moving in reverse direction 222 i.e. from moving in the direction from exit 211 toward entrance 209 within every aperture 106 it passes through owing to the locking of the teeth between the pawl and strap, the rest of loops formed by the strap 304 remains intact and tensioned as before. Thus, device 100/101 enables removal and addition of one or more cables or wires without damaging or disturbing the rest of the cables. Since, the cables or wires 502 can be arranged side-by-side in linear fashion without any overlap, every cable or wire 502 remains accessible independently. As the cables or wires 502 are held spaced apart from each other, chances of physical damage happening to the cables due to friction or due to entanglement or probability of electrical/electromagnetic and thermal interference get reduced. Since, ambient condition is a crucial factor for cable derating calculations, device 100/101 of present invention minimizes the need to derate cables as thermal dissipation improves when cables are held physically separated from each other compared to cables bundled together.

The device 100/101 of the present invention can be constructed as a single, integrally molded piece and made from any suitable conventional material, such as polymers. Alternatively, the various components of the device 100/101 such as the fastening heads 102 connecting members 104 and the fixing ends 108 can be made separately and then attached to each other.

What is claimed is:

1. An apparatus for cable management comprising:
    a plurality of fastening heads, each of said plurality of fastening heads comprising:
        a head body having an outer surface and one or more inner surfaces, said outer surface defining a first side, a second side opposite to said first side and a plurality of end sides, and each of said one or more inner surfaces defining a plurality of walls which cooperatively form an aperture thereamong extending from said first side to said second side, said aperture having an aperture width sufficient to receive therethrough an elongated strap having a strap width and a plurality of strap teeth;
    one or more pawls extending from a first wall of said plurality of walls toward a second wall of said plurality of walls opposite to said first wall, each of said one or more pawls comprising a face having one or more pawl teeth; and
    one or more connecting members, each of said one or more connecting members connecting each of said plurality of fastening heads to another fastening head of said plurality of fastening heads on at least one of said plurality of end sides;
    wherein insertion of said elongated strap through a plurality of said apertures forms one or more securing loops while an engagement between said one or more pawl teeth and one or more of said plurality of strap teeth permits movement of said elongated strap in a first direction but prevents movement of said elongated strap in a second direction.

2. The apparatus for cable management of claim 1, wherein a flexible alignment guide disposed on said head body is configured to apply a biasing force to urge said elongated strap into an alignment with said face of said pawl for said engagement between said one or more pawl teeth and said one or more of said plurality of strap teeth.

3. The apparatus for cable management of claim 2, wherein said flexible alignment guide comprises one or more flexible elements angularly extending from one or more of said plurality of walls into said aperture, each of said one or more flexible elements having a free end adapted to extend along said first direction.

4. The apparatus for cable management of claim 3, wherein said free ends of said one or more flexible elements flex to apply said biasing force on said elongated strap.

5. The apparatus for cable management of claim 1, wherein said one or more connecting members being configured to be severed by an application of a mechanical force to separate said one or more plurality of fastening heads from each other.

6. The apparatus for cable management of claim 1, wherein each of said one or more pawl teeth comprises an engagement region having a leading edge oriented inwardly toward said second wall and a flank region extending downwardly from said leading edge, said engagement region being configured for said engagement between said one or more pawl teeth and said one or more of said plurality of strap teeth.

7. The apparatus for cable management of claim 6, wherein said engagement region comprises a base contact region having a first width, and a frontal contact region having a second width narrower than said first width measured along said leading edge, said frontal contact region being dimensioned and shaped to extend beyond said base contact region toward said second wall.

8. The apparatus for cable management of claim 7, wherein said second width of said frontal contact region is configured to be narrower than a width of said plurality of strap teeth.

9. The apparatus for cable management of claim 6, wherein said flank region extending downwardly from said leading edge of a first pawl tooth of said one or more pawl teeth meets said engagement region of a second pawl tooth of said one or more pawl teeth.

10. The apparatus for cable management of claim 1, wherein a fixing end having an internal wall is disposed on at least one of said plurality of end sides of a fastening head of said plurality of fastening heads, said fixing end comprising a plurality of ribs extending radially inwardly from said internal wall.

11. The apparatus for cable management of claim 1, wherein one or more projection are disposed at said first side and said second side.

12. A method for cable management comprising:
    providing a plurality of fastening heads, each of said plurality of fastening heads comprising:
        a head body having an outer surface and one or more inner surfaces, said outer surface defining a first side, a second side opposite to said first side and a plurality of end sides, and each of said one or more inner surfaces defining a plurality of walls which cooperatively form an aperture thereamong extending from said first side to said second side, said aperture having an aperture width sufficient to receive therethrough an elongated strap having a strap width and a plurality of strap teeth; and providing one or more pawls extending from a first wall of said plurality of walls toward a second wall of said plurality of walls opposite to said first wall, each of said one or more pawls comprising a face having one or more pawl teeth; and providing one or more connecting members, each of said one or more connecting members connecting each of said plurality of fastening heads to another fastening head of said plurality of fastening heads on at least one of said plurality of end sides;

wherein insertion of said elongated strap through a plurality of said aperture forms one or more securing loops while an engagement between said one or more pawl teeth and one or more of said plurality of strap teeth permits movement of said elongated strap in a first direction but prevents movement of said elongated strap in a second direction.

13. The method of claim 12, wherein a flexible alignment guide disposed on said head body is configured to apply a biasing force to urge said elongated strap into an alignment with said face of said pawl for said engagement between said one or more pawl teeth and said one or more of said plurality of strap teeth.

14. The method of claim 13, wherein said flexible alignment guide comprises one or more flexible elements angularly extending from one or more of said plurality of walls into said aperture, each of said one or more flexible elements having a free end adapted to extend along said first direction.

15. The method of claim 14, wherein said free ends of said one or more flexible elements flex to apply said biasing force on said elongated strap.

16. The method of claim 12, wherein said one or more connecting members being configured to be severed by an application of a mechanical force to separate said one or more fastening heads from each other.

17. The method of claim 12, wherein each of said one or more pawl teeth comprises an engagement region having a leading edge oriented inwardly toward said second wall and a flank region extending downwardly from said leading edge, said engagement region being configured for said engagement between said one or more pawl teeth and said one or more of said plurality of strap teeth.

18. The method of claim 17, wherein said engagement region comprises a base contact region having a first width, and a frontal contact region having a second width narrower than said first width measured along said leading edge, said frontal contact region being dimensioned and shaped to extend beyond said base contact region toward said second wall.

19. The method of claim 17, wherein said flank region extending downwardly from said leading edge of a first pawl tooth of said one or more pawl teeth meets said engagement region of a second pawl tooth of said one or more pawl teeth.

20. The method of claim 12, wherein a fixing end having an internal wall is disposed on at least one of said plurality of end sides of a fastening head of said plurality of fastening heads, said fixing end comprising a plurality of ribs extending radially inwardly from said internal wall.

* * * * *